United States Patent [19]

Sato

[11] 4,342,288
[45] Aug. 3, 1982

[54] WATER INDUCTION SYSTEM FOR INTERNAL COMBUSTION ENGINES

[75] Inventor: Kazuo Sato, Ogden, Utah

[73] Assignee: The Klane Corporation, Ogden, Utah

[21] Appl. No.: 164,794

[22] Filed: Jun. 30, 1980

[51] Int. Cl.$^3$ ............................................. F02D 19/00
[52] U.S. Cl. ................................ 123/25 B; 123/25 L
[58] Field of Search ................. 123/25 B, 25 L, 25 J, 123/25 D, 25 P, 25 R

[56] References Cited

U.S. PATENT DOCUMENTS

| | | | |
|---|---|---|---|
| 2,513,773 | 7/1950 | Anderson | 123/25 L |
| 3,911,871 | 10/1975 | Williams et al. | 123/25 L |
| 4,125,092 | 11/1978 | Inamura | 123/25 L |
| 4,286,550 | 9/1981 | Lewis | 123/25 L |

*Primary Examiner*—Ira S. Lazarus
*Attorney, Agent, or Firm*—Thorpe, North & Western

[57] ABSTRACT

A water induction system for internal combustion engines which is comprised of a metering device for metering controlled amounts of air and water, a reverse needle vacuum control valve which is operated in response to intake manifold vacuum and is connected to the metering device, and a heater wherein the air-water mixture is vaporized. The manifold vacuum regulated reverse needle control valve allows an increasing amount of air and water to be drawn into the heater as manifold vacuum pressures drop, engine load increases and the engine requires more vapor. At lower loads, the valve operates to cut back the air-water flow into the engine.

3 Claims, 5 Drawing Figures

WATER INDUCTION SYSTEM FOR INTERNAL COMBUSTION ENGINES

BACKGROUND OF THE INVENTION

This invention relates to a system for regulating the production and introduction of an air-water mixture in its vaporized state into the air-fuel mixture of an internal combustion engine.

There are many improvements and advantages which result upon addition of air-water vapor to the air-fuel mixture of an internal combustion engine such as: better emissions control, less carbon formation in the cylinder, less knocking and pinging because of better suppression of detonation, reduced internal engine temperatures, use of lower octane fuels and often an increase in horsepower. When properly regulated, the addition of an air-water mixture in its vapor form results in a cleaner and more efficiently operating engine.

The regulation of the addition of water vapor has been a problem in many prior art systems. Often too little or too much water vapor was added resulting in poor combustion or not giving the desired improvements. Several systems have used vacuum methods to regulate the rate of flow of water vapor into the air-fuel mixture. Many vacuum systems use ported vacuum in such a manner that they do not provide the maximum amount of water vapor at the time when it is most needed.

U.S. Pat. No. 4,125,092 discloses a system and method for metering an air-water mixture into an internal combustion engine in response to peak engine demand under certain operating circumstances. This patent primarily operates in response to ported vacuum. By ported vacuum is meant vacuum drawn from the carburetor above the throttle. However, in certain new automobiles, ported vacuum is very erratic or not available to be utilized at all. Thus, the ported vacuum system disclosed in this patent is not appropriate for usage in such newer automobiles.

OBJECTS AND SUMMARY OF THE INVENTION

It is an object of the present invention to provide a system wherein required amounts of air-water mixture are vaporized and introduced into an internal combustion engine in the proportions required for most efficient engine operation.

It is another object of the present invention to provide an intake manifold vacuum controlled valve which allows maximum air-water flow rate to the heater for vaporization as engine load increases requiring more water vapor and decreases the feed as the load on the engine requires.

It is a further object of the invention to provide a vacuum controlled air-water vapor metering system for vehicles which have erratic ported vacuum or no ported vacuum.

These and other objects are met by a modified system similar to that disclosed in U.S. Pat. No. 4,125,092 which is responsive to manifold vacuum. This system comprises a control valve containing a specifically configured valve needle wherein the valve needle in the valve control system operates reversely and wherein the valve needle is configured to completely block the flow of an air-water mixture to the engine when the valve needle is completely opened within the valve body.

When operating within the desired range, the manifold vacuum fluctuates as a function of the throttle opening, the rpm of the motor and the torque on it. Zero or very low manifold vacuum is present when the load on an engine suddenly increases, such as when accelerating or beginning to climb an incline. At low manifold vacuum, the control valve of this invention operates to give maximum flow rate of air-water mixture to the engine thus improving its efficiency. At very low engine loads such as when the car is coasting or when there is minimum demand in the engine to maintain a vehicle's momentum, little water addition is required. Under these conditions, the manifold vacuum is high and the control valve shuts off further supply of air-water mixture to the engine. As with the prior art system, the metered air-water mixture is sent to an exhaust heater where it is vaporized and heated following which it is fed into the intake manifold at a point below the throttle.

This invention can also meter in vapor for gasahol, propane or other light hydrocarbon fuel engines.

DRAWINGS OF THE INVENTION

DETAILED DESCRIPTION OF THE INVENTION

Figure 1:
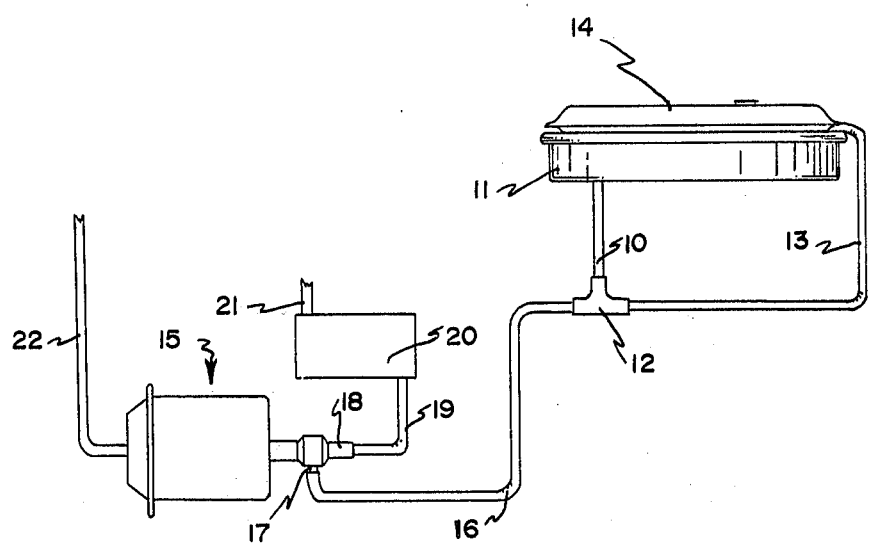
FIG. 1 is a schematic representation of the air-water induction system.
Figure 4:
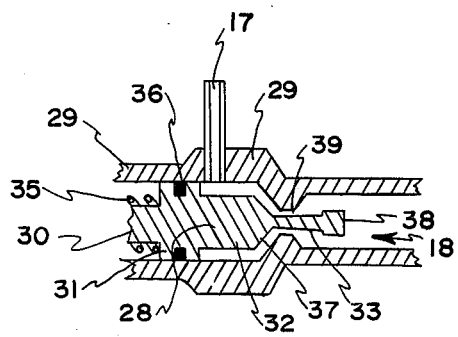
FIG. 4 is a partial cross-sectional view of a reverse control valve showing the position of this valve needle where engine load is rapidly increasing and intake manifold vacuum is at a minimum allowing maximum flow of the air-water mixture past the reverse needle valve.
Figure 5:
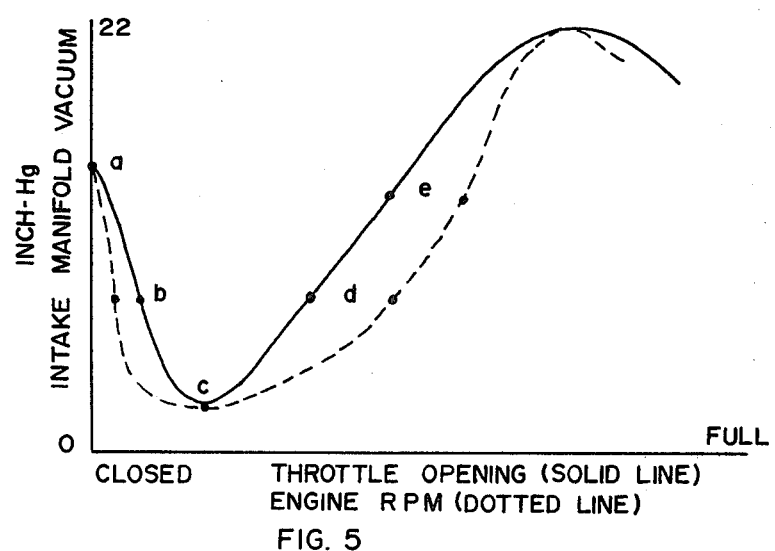
FIG. 5 is a graphic representation of the intake manifold vacuum as compared with the engine rpm and throttle opening of a typical internal combustion engine with the normal driving range region and the region where the valve is open being marked on the graph.

There is shown in FIG. 1 a complete schematic diagram of the present invention similar to that taught in U.S. Pat. No. 4,125,092 issued Nov. 14, 1978. The position of the valve needle in the reverse control vacuum valve of the present invention is represented at differing engine load conditions in FIGS. 2 to 4. FIG. 5 shows the total and normal ranges over which a vacuum is created as it relates to engine rpm and throttle opening.

For the purpose of this description, the vacuum source for the control valve is that provided by the manifold vacuum. Essentially this invention provides for an improved manifold vacuum controlled reverse needle valve system which functions within the system as outlined in U.S. Pat. No. 4,125,092 issued Nov. 14, 1978. The improved reverse needle valve meets the needs of some late model cars as well as some older cars and trucks which have erratic ported vacuum or no available ported vacuum. The present invention has been found to provide improved performance over most of the driving range of a vehicle including essentially all normal road and driving conditions.

The water induction system to be described involves the use of an air source, a water source, a metering means for mixing the two, a metering valve to control the amount fed to a vaporizer heating unit, the heating unit itself, and means of connecting said units as described in U.S. Pat. No. 4,125,092. The present invention revolves around the working of the manifold vacuum controlled reverse needle valve.

The system is schematically shown in FIG. 1 wherein an air bleed tube 10 extends from an air filter 11 or other air source and enters a metering assembly 12. Also entering the metering assembly 12 is a water line 13 leading into the metering assembly 12 from a water reservoir 14. By variation in the air and water orifice sizes in metering assembly 12, the metering and mixing of air and water takes place. They are drawn into the metering system 12 by means of the intake manifold vacuum which passes through the reverse needle control valve assembly 15 and along the air water line 16 which connects the metering assembly 12 and the valve assemblage 15. The air-water mixture is able to pass along the air-water line 16 and through the valve assembly 15 according to the positioning of a valve needle within such assembly. The air-water mixture enters through the entry port 17 and passes around the valve needle body through an aperture opening in the valve assembly as the valve needle is drawn backward or forward, depending on the vacuum applied to the system from the intake manifold, and passes out of the valve 15 by exit port 18. It is then carried along the line 19 and to an exhaust heater 20. Vapor produced in the heater 20 is introduced by the steam line 21 into the engine at a point below the throttle and before the intake manifold. The valve assembly 15 is also connected to the intake manifold via line 22. Because of the vacuum in line 22 operating on a movable diaphragm within the control valve assembly 15, the needle valve is moved to control the vapor induction process.

Figure 2:
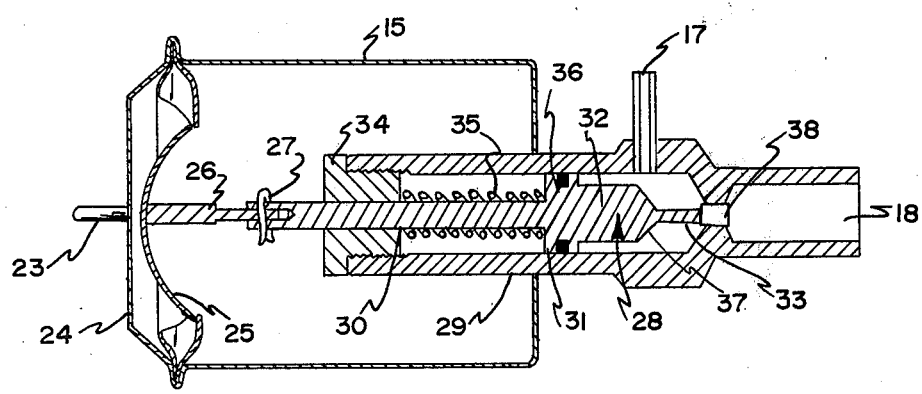
FIG. 2 is a cross-sectional view of a reverse control valve assembly with the valve needle fully pulled open to represent the situation where the engine is idling and the intake manifold vacuum is high allowing no flow of air-water mixture to the exhaust heater.

With the general mode of operation of the system having been described, the details and functioning of the reverse needle valve control system will now be described in full:

The intake manifold vacuum reverse needle control valve assembly 15 as shown in FIG. 2 consists of the vacuum line attachment 23 irremovably connected to the back end 24 of the movable valve diaphragm 25. Extending from the diaphragm 25 backward is a connecting or diaphragm rod 26 which is attached by a pin 27 to a reverse valve control needle 28 housed inside the reverse valve control needle housing 29.

The valve needle consists of a forwardly extending elongated neck portion 30 of uniform diameter a shoulder portion 31, a body portion 32 and a rearwardly extending tail 33. An adjustable nut 34 is inserted into the formed end of valve housing 29. Valve needle 28 is positioned within housing 29 such that neck portion extends forwardly through an aperture in nut 34 and is interconnected with diaphragm rod 26 by pin 27. Surrounding neck portion 30 and interspersed between nut 34 and valve shoulder portion 31 is a spring 35.

Spring 35 operates in concert with the vacuum to allow the valve needle 28 to be pulled forward as the intake manifold vacuum increases or push it backward as it decreases. The compression and tension of spring 35 may be regulated by adjustment of nut 34. Shoulder portion 31 has a diameter such that it rests flush with the inner walls of the reverse needle valve housing 29. An O-ring 36 is sealed in a groove in shoulder 31 and contacts the inner walls of housing 29 in a fluid tight relationship.

The body portion 32 of the valve needle is of lesser diameter than the shoulder and terminates in backwardly tapering walls 37. The tail 33 of the valve extends backwardly from the tapered walls 37 of the body portion 32 as an extension thereof. The tail 33 is of minimum diameter at the point of juncture with the body portion 32 and uniformly increases in diameter as it extends backwardly and terminates in a step 38 of uniform diameter which is on the order of 0.001 to 0.005 inches larger than the diameter of the tail immediately preceding the step. The valve housing in the area rearward of entrance port 17, slants inwardly and backwardly at an angle parallel with tapered walls 37 of valve body 32 to form an aperture 39 having a diameter the same as the diameter of step 38. Step 38 and the wall defining step 38 are machined such that step 38 will slip fit into aperture 39. The valve needle tail 33 extends backwardly through aperture 39 and is positioned such that at zero vacuum tapered walls 37 rest against similarly tapered walls of housing 29. At idle vacuum, the valve needle is pulled forward such that step 38 enters and seals aperture 39 in a fluid tight relationship. At intake manifold vacuums varying between zero and idle, the valve tail will be positioned between these two extremes thus allowing air-water mixtures to flow through inlet port 17, aperture 39 and out exit port 18 in varying amounts.

The shoulder 31 prevents flow of vapor from the air-water inlet port 17 into the neck portion 30 of the needle where the spring 35 is enclosed. Thus, air-water flow is routed around the needle valve body 32 and through the aperture 39 if the needle is positioned so as to allow such flow. When the car is idling, the nut 34 is adjusted within housing 29 to provide spring 35 with proper tension such as to allow this maximum vacuum to pull the needle forward pulling the step 38 into aperture 39 thereby preventing the flow of air-water to the engine.

Figure 3:
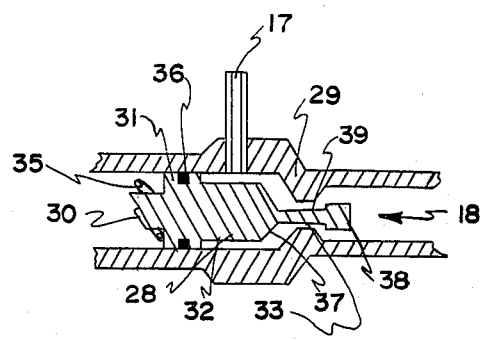
FIG. 3 is a partial cross-sectional view of a reverse control valve showing the position of the valve needle at average engine load or as the car is beginning to accelerate.

FIG. 2 shows the position of the valve tail 33 and step 38 at engine idling conditions showing how the flow of the air-water mixture is prevented. In FIGS. 3 and 4 the vacuum has decreased from that amount supplied by the intake manifold during engine idling speeds. This indicates that the throttle has opened and engine rpm has increased indicating an increasing need for vapor injection into the air fuel mixture in the engine. Upon a decrease in the vacuum, the diaphragm 25 moves backward accordingly displacing the diaphragm rod 26 and the valve needle 28. The displacement causes the step 38 to move out of the aperture 39 and the air-water mixture enters the valve by the inlet port 17, flows through the aperture 39, and out of the valve by the exit port 18 to the exhaust heater 20 where said mixture is vaporized and injected into the intake manifold. When vacuum is lowest, the greatest vapor flow passes through the aperture 39 as shown in FIG. 4 due to the fact that the valve needle tail 33 is at its minimum diameter leaving the maximum amount of aperture opening 39 available for passage of vapor.

The three valve needle 28 and tail 33 positionings of FIGS. 2, 3 and 4 are represented in FIG. 5 according to the responding vacuum controlling the needle. In FIG. 5 point (a) represents the positioning shown in FIG. 2 when the car is idling and vacuum is high causing closure of the aperture opening 39 by the tail step 38. At point (e) the same vacuum is reached again closing the aperture 39, but this time the car is not idling but is operating under cruise conditions with minimum engine load to maintain momentum. Under such conditions, there is no need to add vapor to the engine. The range of the vacuum between points (a) and (e) are what are experienced in a small car under normal driving conditions. Thus, past point (e) under normal conditions, no vapor addition is needed. Points (b) and (d) represent the vacuum at the needle valve positioning of FIG. 3. Vacuum is dropping or increasing as rpm increases and as the throttle opens. Point (b) is indicative of start ups or the beginning of acceleration in a car. Point (d) is indicative of leveling off from start up or acceleration to a cruise speed. Point (c) is the low vacuum which causes the valve to move forward as shown in FIG. 4. The low vacuum point occurs as engine load increases under normal conditions, and there is a great need to increase the car's momentum thereby decreasing the torque on the engine. Past point (c) the vacuum decreases passing through point (d) because the car arrives at accelerated and cruise conditions where there is less load on the engine due to increased momentum. As vacuum increases beyond point (e) the need to add vapor to the air-fuel mixture entering the intake manifold is eliminated. Vacuum continues to increase past point (e) in FIG. 5 under certain conditions such as when a car begins to decelerate, the throttle closes, and rpm continues to increase causing a rapid rise in vacuum because of the pressure drop in the cylinders. Under these conditions, there is no need for water induction. Therefore the normal driving range vacuum at the intake manifold is between points (a) and (e). It is that range for which vapor induction is most needed and gives a cleaner and a much more efficient engine.

As can be seen from the above, valve needle 28 operates in a reverse manner to the prior art system and is adapted to be used in circumstances where the prior art system could not be used.

No attempt has been made to give specific dimensions, tolerances or flow rates as they may vary from one model of vehicle to another and may be empiracally determined by one having ordinary skill in the art. The parameters for operation given in U.S. Pat. No. 4,125,092 are generally applicable to the present invention.

Although the invention as has been described is deemed to be that which would form the preferred embodiment of the invention, it is recognized that departures may be made therefrom without departing from the scope of the invention which is not to be limited to the details disclosed, but is to be accorded the full scope of the claims so as to include any and all equivalent devices and apparatus.

I claim:

1. A method for controlling the injection of a heated vaporized air-water mixture into the fuel system of an internal combustion engine which comprises a vacuum control valve which operates to prevent the flow of air-water mixture when both fully opened and closed and is responsive to intake manifold vacuum pressures of the internal combustion engine such that at engine idle speeds, the manifold vacuum pressure fully opens said control valve presenting the flow of air-water therethrough whereas at intake manifold pressures less than that at engine idle speed and greater than zero said control valve operates to allow air and water to be drawn from an air source and a water source to an air water metering means to form an air-water mixture which mixture then passes through said control valve to a heating means for additional vaporization and then into the air fuel mixture entering the intake manifold of said engine and wherein the lower the intake manifold vacuum pressure drops from the pressure at engine idle speed, the greater the amount of air-water mixture passing through the control valve will be, providing the intake manifold pressure does not drop to zero.

2. In an apparatus for injecting an air-water vapor mixture into the fuel system of an internal combustion engine which comprises a water source, an air source, an air-water metering device, means for leading air and water from said sources to said air-water metering device, a vacuum responsive control valve, means to direct an air-water mixture from said metering device through said control valve, heating means to heat the air-water mixture and means to direct the air water mixture from said control valve through said heating means and into the fuel system of said engine; the improvement which comprises providing means for connecting the vacuum responsive control valve to the intake manifold of an internal combustion engine and also providing said vacuum responsive control valve with valve needle means which permit the flow of air-water vapors through said control valve only at intake manifold vacuum pressures which are less than that obtained at engine idle speeds but greater than zero wherein the valve needle means is configured such that the lower the intake manifold pressure drops from the pressure at engine idle speeds, the greater the flow of air-water vapors through the control valve will be, providing the intake manifold pressure is greater than zero.

3. In a vacuum operated control valve for air-water mixtures comprising a vacuum chamber containing a vacuum responsive diaphragm; a rod interconnecting said diaphragm with a valve needle having a forwardly extending elongated neck, a thickened valve body having a forward portion containing sealing means and a less thick intermediate portion and a rearwardly tapering back portion terminating in a rearwardly extending tail which increases in circumference to a predetermined size; a housing surrounding said valve needle, said housing having a closed forward end through which the elongated neck of the valve needle extends an open rear end and an internally tapered neck defining an exit port, said portion of the housing forward of the tapered neck having the same diameter as the forward portion of the valve body such that the valve body engages the housing in a fluid tight relationship, said tapered neck being adapted to seat the tapered portion of the valve body with the valve needle tail extending through and rearwardly of the exit port; an inlet port in said housing adjacent the intermediate portion of the valve body and forward of the tapered neck; a valve spring surrounding the elongated neck of the valve needle and positioned in the housing between the closed forward end thereof and the valve body such that the valve needle is tensioned in a closed position sealing the exit port from the inlet port in a fluid tight relationship in the absence of vacuum pressure, the improvement which comprises providing the rearwardly extending tail with a terminal step of uniform diameter which is the same diameter as that of the exit port in the area of the tapered neck such that when vacuum is applied causing said step to enter said exit port, the exit port will be sealed in a fluid tight relationship.

* * * * *